(12) United States Patent
Hertlein et al.

(10) Patent No.: US 11,667,533 B2
(45) Date of Patent: *Jun. 6, 2023

(54) PROCESS FOR PREPARING POLYCRYSTALLINE SILICON

(71) Applicant: WACKER CHEMIE AG, Munich (DE)

(72) Inventors: Harald Hertlein, Burghausen (DE); Heinz Kraus, Zeilarn (DE)

(73) Assignee: Wacker Chemie AG, Munich (DE)

( * ) Notice: Subject to any disclaimer, the term of this patent is extended or adjusted under 35 U.S.C. 154(b) by 936 days.

This patent is subject to a terminal disclaimer.

(21) Appl. No.: 16/485,774

(22) PCT Filed: Dec. 14, 2016

(86) PCT No.: PCT/EP2016/080897
§ 371 (c)(1),
(2) Date: Aug. 13, 2019

(87) PCT Pub. No.: WO2018/108257
PCT Pub. Date: Jun. 21, 2018

(65) Prior Publication Data
US 2020/0231449 A1    Jul. 23, 2020

(51) Int. Cl.
*C01B 33/035*    (2006.01)

(52) U.S. Cl.
CPC .................. *C01B 33/035* (2013.01)

(58) Field of Classification Search
CPC . C01B 33/035; C01B 33/10763; C01B 33/03; C01B 33/00; C01B 33/1071; C01B 33/027; C01B 33/10757; C01B 33/10778
See application file for complete search history.

(56) References Cited

U.S. PATENT DOCUMENTS

| 2,938,772 | A | 5/1960 | Enk et al. |
| 6,060,021 | A | 5/2000 | Oda |
| 9,988,714 | B2 * | 6/2018 | Haeckl ............. C01B 33/10778 |
| 10,526,206 | B2 * | 1/2020 | Weckesser ........... C01B 33/027 |
| 2011/0206842 | A1 | 8/2011 | Revankar et al. |
| 2013/0011558 | A1 | 1/2013 | Haeckl et al. |
| 2013/0280533 | A1 | 10/2013 | Weckesser et al. |
| 2015/0221513 | A1 * | 8/2015 | Majima ............ H01L 21/02653 438/488 |

FOREIGN PATENT DOCUMENTS

| CN | 102167326 A | 8/2011 |
| EP | 2551239 B1 | 3/2014 |
| EP | 2653446 B1 | 6/2016 |
| EP | 2077252 B1 | 2/2017 |
| JP | 11020895 A | 1/1999 |
| WO | 14103939 A1 | 7/2014 |

OTHER PUBLICATIONS

Hsu et al (Fines in Fluidized Bed Silane Pyrolysis, J. Electrochem, 1984, pp. 660-663).*
Figures 7 and 8 on p. 58 in O'Mara, B. Herring, L. Hunt; Handbook of Semiconductor Silicon Technology; ISBN 0-8155-1237-6.

* cited by examiner

*Primary Examiner* — Smita S Patel
(74) *Attorney, Agent, or Firm* — Brooks Kushman P.C.

(57) ABSTRACT

The invention relates to a process for preparing polycrystalline silicon, comprising introducing a reaction gas containing hydrogen and silane and/or halogen silane into a reactor, wherein the reactor comprises at least one heated carrier body, on which elementary silicon has been deposited by means of pyrolysis, forming the polycrystalline silicon. In a continuous process, waste gas is led out of the reactor and hydrogen recovered from said waste gas is fed to the reactor again as circulating gas. The circulating gas has a nitrogen content of less than 1000 ppmv. The invention further relates to polycrystalline silicon having a nitrogen component of less than 2 ppba.

16 Claims, 2 Drawing Sheets

PROCESS FOR PREPARING POLYCRYSTALLINE SILICON

CROSS-REFERENCE TO RELATED APPLICATIONS

This application is a U.S. National Phase Application of PCT/EP2016/080897 filed. Dec. 14, 2016 the contents of which are incorporated herein by reference in their entireties for all purposes.

FIELD OF THE INVENTION

The invention relates to polycrystalline silicon and to a process for producing it.

BACKGROUND OF THE INVENTION

Polycrystalline silicon (for short: polysilicon) is produced customarily by means of the Siemens process. In that process a reaction gas comprising one or more silicon-containing components and hydrogen is introduced into a generally bell-shaped reactor (Siemens reactor). The reactor usually contains one or more carrier bodies (slim rods, filament rods) of silicon which are heated by direct passage of current. Depositing on these carrier bodies by pyrolysis is silicon in solid form. Rods of polysilicon are formed. Silicon-containing components used may be silane (SiH4), monochlorosilane ($SiH_3Cl$), dichlorosilane ($SiH_2Cl_2$), trichlorosilane ($SiHCl_3$), tetrachlorosilane ($SiCl_4$), or mixtures of the stated compounds.

Granules of polycrystalline silicon may be an alternative to polysilicon produced by the Siemens process. While the polysilicon in the Siemens process is obtained in general in the form of a cylindrical rod of silicon, which is customarily comminuted prior to its further processing, polysilicon granules possess qualities of a bulk product.

The deposition of the elemental silicon is accompanied by formation of an offgas which is composed of unconverted reaction gas and gaseous byproducts, particularly halosilanes. The processing of this offgas, especially the recovery of unused hydrogen, is receiving increased attention for reasons of cost.

The processing of the offgas from silicon deposition is known in principle, from EP 2 551 239 A1, for example. Moreover, corresponding recycle processes can be seen in FIGS. 7 and 8 on page 58 in O'Mara, B. Herring, L. Hunt: *Handbook of Semiconductor Silicon Technology*; ISBN 0-8155-1237-6.

The offgas is customarily supplied to a multiple condensation facility, where the condensate is separated via a distillation column into low-boiling and high-boiling fractions. The low-boiling fractions are supplied again to the deposition. The high-boiling fractions generally include a large part of silicon tetrachloride (STC), which can be converted into trichlorosilane (TCS) in a converting facility (converter).

The gaseous fractions of the offgas that remain after the condensation are supplied to an adsorption procedure. Here, the hydrogen is removed from the other constituents of the gas stream and is resupplied as recycle gas to the deposition process. Additionally, the recycle gas may also be admixed with fresh hydrogen (provided or generated externally), generated for example by means of a steam reformer. Constituents of the reaction gas may additionally or alternatively be added.

For technical reasons, examples being unavoidable leakages and nitrogen-containing dead spaces, operation without introduction of nitrogen into the recycle gas system is fundamentally not possible. Moreover, the fact that on safety grounds (prevention of explosive hydrogen/oxygen gas reaction) the system must be flushed with nitrogen before and after each start-up leads to the introduction of nitrogen into the recycle gas system. In dead spaces such as, for example, sampling lines to measuring instruments, indeed, there customarily remain residues of nitrogen which subsequently, on start-up, pass into the recycle gas system.

Polysilicon is used as a starting material for the production of monocrystalline silicon by means of crucible pulling (Czochralski (CZ) process) or of zone melting (float zone (FZ) process). This monocrystalline silicon is divided up into wafers and, after a great many mechanical, chemical, and chemomechanical operations, is used in the semiconductor industry. Polysilicon is additionally required for the production of mono- or multicrystalline silicon by means of pulling or casting processes, this being used for the fabrication of solar cells.

A significant problem in the production of monocrystalline silicon are dislocation defects (one-dimensional, i.e., linear disturbances) and stacking defects (two-dimensional, i.e., extensive disturbances) in the crystal structure of the silicon crystals obtained. Both phenomena reduce the yield, since in principle the only silicon crystals suitable for use in the photovoltaic and electronics industry are those which do not exceed a certain number of crystal defects. For silicon wafers, the number of stacking defects is customarily to be less than 300 per square centimeter. In the case of monocrystalline silicon rods, there ought in principle to be less than one dislocation defect per meter of rod length, or the dislocation-free rod length ought to be greater than 70%.

From EP 2 653 446 A2 it is known that the nitrogen content of a polysilicon used as starting material has an adverse effect on crystal growth. Consequently, a nitrogen content in a range between 10 and 2000 ppba (parts per billion atoms) is proposed in order not to critically detract from the quality of the downstream products. To date it has been assumed that the nitrogen present during the deposition of the polysilicon, from the recycle gas, for example, is incorporated (dissolved) inertly in the crystal lattice and that the quality of the resulting polysilicon is affected only by n-doping.

BRIEF SUMMARY OF THE INVENTION

It has surprisingly been observed, however, that in the production of polysilicon, the quality of the polysilicon product goes down as the deposition temperature goes up, with the cause of this correlation having so far remained unresolved. In a SIMS (secondary ion mass spectrometry) analysis of polysilicon, deposited with different concentrations of nitrogen in the reaction gas, it was at least not possible to find any increase in inert incorporation of nitrogen.

For this reason, in the production of polysilicon, the deposition temperature is generally not increased above a critical value of about 1030° C. Up to this temperature, no substantial deterioration in product quality has been ascertained. Temperatures below about 1010° C. are customary. For reasons of economic profitability, however, it would be desirable to raise the deposition temperature, since that would entail a higher reaction rate and, consequently, an increased reactor yield.

The problem addressed by the present invention was that of providing polysilicon which in its further processing causes no or only a small number of dislocation and stacking defects in the downstream product. The polysilicon ought, moreover, to be capable of being produced by a particularly profitable process.

This problem is solved by means of a process having the features of claim 1 and also by a polycrystalline silicon having the features of claim 12.

DETAILED DESCRIPTION OF PREFERRED EMBODIMENTS

Figure 1:
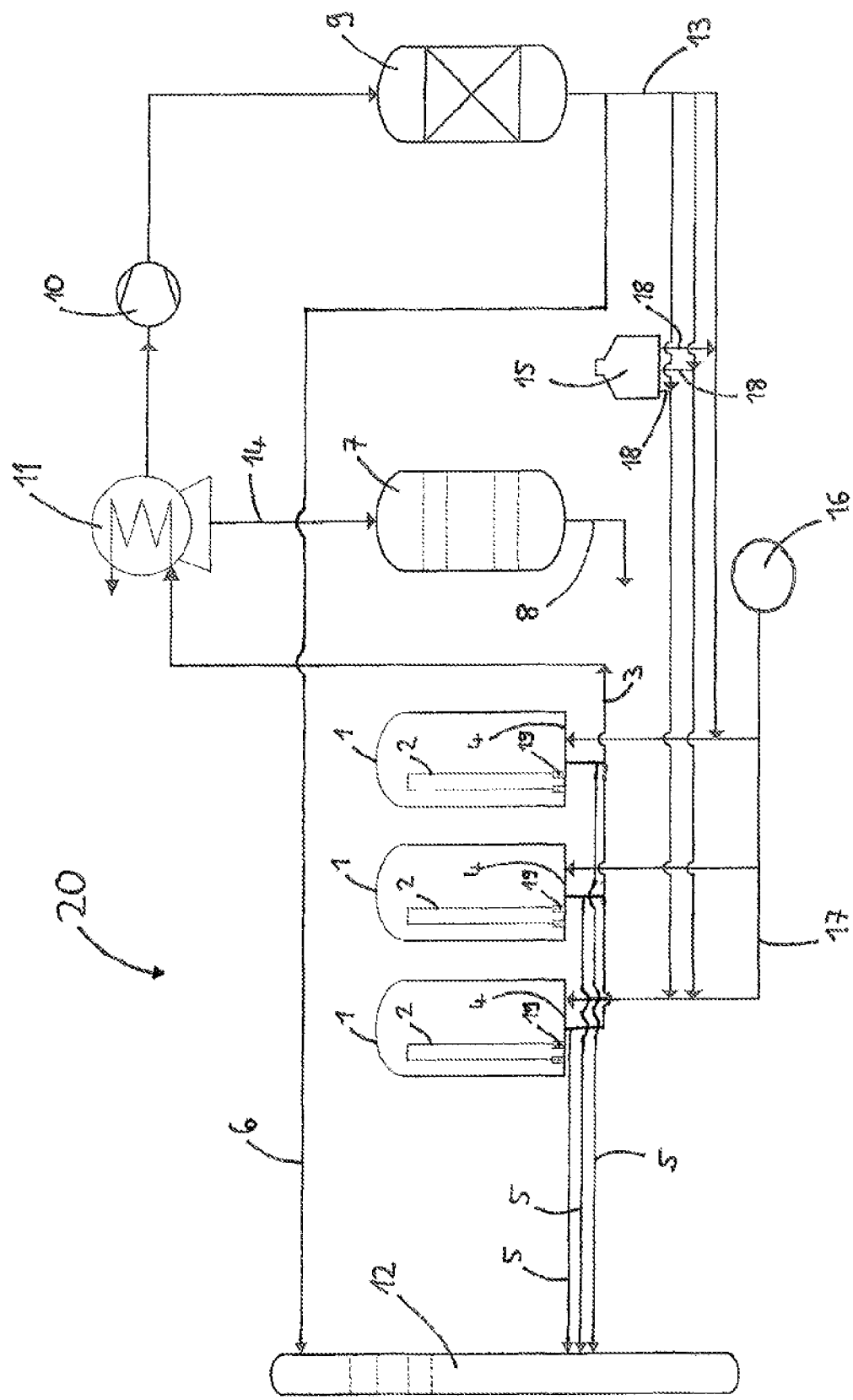
FIG. 1 shows a diagram of a plant for implementing the process of the present invention.

The process of the invention is carried out customarily in a Siemens reactor. This reactor preferably comprises a metallic baseplate and a coolable bell which is mounted on the baseplate so as to form a reaction chamber in the interior of the bell. The baseplate may be provided with one or more gas inlet openings for the reaction gas and one or more gas outlet openings for offgas. It is also customarily provided with electrode mounts. In the electrode mount there is usually a connection carrier used, customarily made of graphite, which is provided with a hole for accommodating the carrier body. The connection carrier, which may also be referred to as the graphite electrode, fixes the carrier body. EP 2 077 252 A2 describes a typical construction of a Siemens reactor.

The carrier body preferably comprises two filament rods and a bridge which joins the filament rods to one another in each case at one of their free ends. The two remaining free ends of the filament rods are customarily accommodated by one electrode mount each. The carrier body consists preferably of mono- or polycrystalline silicon. It may, however, also consist of metals, alloys and/or carbon. The filament rods preferably protrude vertically from the electrode mounts into the reaction chamber. Connection to the current supply is fundamentally via the electrode mount. In the course of the process, polysilicon is deposited on the heated carrier body, more particularly on the heated filament rods and the bridge, and this leads to the growth of the diameter of the carrier body. In this way a polysilicon rod, more particularly a U-shaped polysilicon rod, is able to form.

Continuous (recycle) operations for processing offgases and/or recovering hydrogen in the production of polysilicon, and the corresponding recycle gas systems, are known in principle. Reference may be made here, for example, to EP 2 551 239 A1.

Surprisingly it has emerged that even at deposition temperatures of between 1030 and 1150° C., the nitrogen, especially the nitrogen contained in the recycle gas, leads to the formation of $Si_3N_4$ on the surface of the polysilicon. The rate of the formation of $Si_3N_4$ increases exponentially as the deposition temperature goes up. It has been recognized, moreover, that even small amounts of <10 ppba of $Si_3N_4$ in the polysilicon have adverse consequences for the quality of downstream products such as mono- or multicrystalline silicon.

It is assumed that the high melting point of $Si_3N_4$ crystallites in the interior and on the surface ox the polysilicon do not melt during subsequent operations such as pulling or casting processes, and so cause the dislocation and stacking defects in the downstream product. However, the underlying mechanism is not yet conclusively resolved.

According to one preferred embodiment, the nitrogen content in the recycle gas is less than 500 ppmv (parts per million by volume), preferably less than 100 ppmv, more preferably less than 10 ppmv, more particularly less than 0.5 ppmv.

The lower nitrogen content of the recycle gas makes it possible with particular advantage to operate the reactor at higher deposition temperatures, more particularly above 1030° C., than is the usual case with reactors known from the prior art. The increased deposition temperature leads to an increased reaction rate and hence to an increase in the reactor yield. The profitability of the process is therefore improved without detriment to the product quality.

The elemental silicon is preferably deposited at a deposition temperature of between 1030 and 1300° C., preferably between 1032 and 1250° C., more preferably between 1040 and 1200° C., more particularly between 1060 and 1150° C.

The deposition of polysilicon is controlled generally by the mandating of a temperature, the deposition temperature, and/or by the composition and amount of the reaction gas.

In the Siemens process, the deposition temperature is of critical importance to the product quality and profitability of the process. In all Siemens reactors it must be noted that the deposition temperature is heavily dependent on the measurement location and the measurement method. Furthermore, the deposition temperature is a function of the batch running time and hence also of the rod diameter. In general, the deposition temperature is lowered over the batch running time, with increasing rod diameter, by an amount of between 0 and 150° C.

The term "deposition temperature" used here is defined as the average rod temperature over the entire batch running time, with the rod temperature being measured on the surface of a silicon rod or, respectively, of the carrier body that is present at the start.

The individual temperature measurements from which the average rod temperature is formed are made generally on the surface of silicon rods which are not disposed in the immediate vicinity of the reactor wall. Measurement is made usually at a rod height of between 14 and 63%, preferably 20 and 40%, of the entire rod length, starting from the end of the rod anchored in the electrode mount. Typical measurement heights are between 0.5 and 1.5 m, preferably at about 1 m. The measurement is made customarily on an inner rod or rod circle, as for example on the second rod or rod circle starting from the reactor wall. The measurement is made in general using a pyrometer or a thermal imaging camera, with formation of an average value, for example, over a measuring area of between 1 and 90 $cm^2$, preferably between 1 and 30 $cm^2$, more particularly of about 2.5 $cm^2$. In principle, the average value may also be formed on a plurality of rods.

Generally it has been ascertained that the rod temperature in the upper third of the rod is greater than in the lower third of the rod. Furthermore, in the case of rod surfaces facing in the direction of the center of the reaction chamber, the rod temperature generally is higher than in the case of rod surfaces pointing in the direction of the reactor wall. In the case of uneven rod surfaces, moreover, the rod temperature in depressions is generally higher than on elevations.

The temperature referred to as the "hotspot temperature" is the hottest temperature measured on the rod surface. The measuring location may change a number of times over the batch running time. In the region of the bridge, for example, higher rod temperatures are measured in principle, since it is in this region that the electrical current density is the greatest.

In principle, an increase in the deposition temperature is accompanied by an increase in the hotspot temperature. The formation of $Si_3N_4$ may occur at a rod temperature upward of about 1080° C. Because the hotspot temperature is greater than the deposition temperature, $Si_3N_4$ may also form at deposition temperatures below 1080° C. Because the location on the silicon rods at which the hotspot temperature occurs changes as a function of the deposition time (e.g., bridge or end of a rod anchored in the electrode mount), the hotspot temperature is customarily unsuitable as a control variable. It is, however, an important parameter, providing information on whether at certain locations, with an established deposition temperature, there is also a temperature prevailing that is sufficient for the formation of $Si_3N_4$. It has been found that at a deposition temperature of above 1030° C., there is generally also a hotspot temperature of 1080° C. present, and so the deposition temperature of 1030° C. is also referred to as the critical temperature for the formation of $Si_3N_4$.

The deposition temperature may be dictated by control of the electrical power, either on a fixed basis or as a function of the polysilicon rod diameter and/or the time. The composition and the amount of the reaction gas may be dictated as a function of the time and/or of the polysilicon rod diameter.

According to one preferred embodiment of the process, the nitrogen content of the recycle gas is determined by means of a measuring facility. The measuring facility is more particularly a gas chromatograph. For this purpose, a sample can be taken from the reaction chamber and/or from the recycle gas system, and supplied to the measuring facility. The measuring facility may also be provided directly at the location of the sampling.

The sampling takes place preferably at a point in the recycle gas system at which the offgas is taken off from the reactor or at which the recycle gas is resupplied to the reactor. A combination of these two possibilities is also conceivable. Alternatively or additionally, one or more samples may be taken at different points in the recycle gas system, as for example ahead of or behind (upstream or downstream) of an adsorption facility.

According to one further embodiment, when a nitrogen value limit of between 0.01 and 1000 ppmv is exceeded, the reactor is shut down. In this way it can be ensured that polysilicon deposited is not contaminated by $Si_3N_4$.

Preferably, when the nitrogen value limit is exceeded, the supply of the recycle gas into the reactor is interrupted and the process is operated exclusively with external hydrogen until the nitrogen value is again below the limit. External hydrogen in this context refers in particular to hydrogen which is supplied from an external source. The external source may be, for example, a reservoir vessel or a steam reforming facility. It is preferably high-purity hydrogen, more particularly hydrogen with a grade of 3.0 or higher, as for example 5.0.

The interruption to the deposition process may also be accomplished by closing the supply of reaction gas, with the deposition temperature being held above 900° C. If the nitrogen value goes below the limit, it is possible to resume the addition of the reaction gas after establishment of the desired deposition temperature.

In the time until the value falls below the limit, the recycle gas system is preferably decoupled completely from the reaction chamber of the reactor. In this case the recycle gas system is preferably flushed with external hydrogen until the nitrogen value falls below the limit. If no measuring facility is assigned to the recycle gas system, the flushing time may also be fixed for a particular duration, such as an hour, for example. It is also possible for the recycle gas system to be flushed with a gas other than nitrogen, such as with a noble gas such as argon or helium, for example. When the nitrogen value falls below the limit, the addition of the external hydrogen can in part be stopped again and the process can be carried out anew using recycle gas.

According to a further embodiment, if the nitrogen value limit of between 0.01 and 1000 ppmv is exceeded, the deposition temperature is reduced until the nitrogen value is again below the limit. The reduction in the deposition temperature may be brought about by a reduction in the electrical power. The limit value is measured preferably in the entry gas of the reactor.

The recycle gas may be admixed with up to 90%, preferably up to 40%, more preferably up to 10% of external hydrogen. The greater the amount of hydrogen that can be recovered from the offgas, the smaller the fraction of external hydrogen that need be added.

According to one preferred embodiment, the halosilane, as a constituent of the reaction gas, is a chlorosilane, more particularly trichlorosilane (TCS), or a mixture of trichlorosilane (TCS) and dichlorosilane (DCS).

The specific molar flow rate of halosilane is preferably in a range between 0.2 to 15 kmol/h, more preferably 0.4 to 8 kmol/h, per square meter of the rod surface. The molar fraction of the halosilanes in the entry gas stream is between 10 and 50%.

The reaction gas is blown into the reaction chamber preferably via one or more nozzles, which are arranged more particularly on the base of the reactor, as for example in the baseplate.

It is preferred if before the start of the process—before the reactor is started up—within the reactor there is a pressure increase with hydrogen (hydrogen flushing) followed by a pressure decrease. Preferably in this case a maximum pressure during the pressure increase is in the range between 3.1 and 15.0 bar, more preferably between 5.0 and 9.0 bar, very preferably between 6.0 and 8.0 bar, more particularly at about 7.0 bar. A minimum pressure during the pressure decrease is preferably in the range between 1.1 and 3.0 bar, more particularly at about 1.4 bar. With particular preference this pressure increase and pressure decrease takes place a number of times one after another, more particularly three times one after the other.

The recycle gas system may be encompassed by this pressure increase and pressure decrease. Preferably, however, the recycle gas system is decoupled ahead of the pressure increase and pressure decrease from the reaction chamber, and optionally undergoes a separate flushing program, in particular with hydrogen.

Both the pressure increase and the pressure decrease preferably last between 1 and 60 minutes, more preferably between 10 and 30 minutes. For a three-fold implementation of this procedure, accordingly, it would be necessary to calculate between 6 and 360 minutes.

The pressure increase takes place preferably with a hydrogen volume flow rate (standard cubic meters [$m^3$] per hour [h]) per unit reactor volume ($V_R$ [$m^3$]) of between 5 and 400 $m^3/hV_R$, preferably between 8 and 250 $m^3/hV_R$, more preferably between 10 and 100 $m^3/hV_R$, more particularly of about 20 $m^3/hV_R$. For a reactor having a reactor diameter of 2.0 m and a reactor height of 4.0 m, this corresponds, for example, to a hydrogen volume flow rate of 6250 $m^3/h$.

Furthermore, it may be preferable, before the hydrogen flushing referred to above, to flush the reactor initially with an inert gas, as for example noble gas or nitrogen, in order to remove oxygen still present. This flushing may in particular be followed by a heating step in which the carrier bodies are heated, preferably by means of a radiant heater. In this way it is possible to ensure that the carrier bodies become electrically conductive and can subsequently be heated further by direct current passage via the electrode mount. This heating step may then be followed by the hydrogen flushing.

A further aspect of the invention relates to polycrystalline silicon, more particularly in rod form, i.e., polycrystalline silicon rod, having a nitrogen fraction of less than 2 ppba. More preferably it has a nitrogen fraction of less than 1 ppba, more particularly less than 0.5 ppba.

The silicon is preferably polycrystalline silicon produced by the Siemens process.

Preferred measurement methods for determining the nitrogen fraction are SIMS (secondary ion mass spectrometry), FTIR (Fourier transform infrared spectroscopy) and/or analysis by means of an oxygen/nitrogen/hydrogen analyzer (e.g., ONH836 series from LECO).

In the case of the polycrystalline silicon of the invention, no $Si_3N_4$ was detectable by scanning electron microscopy (SEM) and energy-dispersive X-ray spectroscopy (EDX).

The polycrystalline silicon of the invention is preferably free from $Si_3N_4$, especially taking account of the detection limits of the measurement methods identified above. Hence the polycrystalline silicon of the invention is considered, for example, to be free from $Si_3N_4$ if no $Si_3N_4$ has been detected in 200 SIMS analyses conducted.

The chlorine content of the polycrystalline silicon, measured by means of a neutron activation analysis or X-ray fluorescence analysis, is preferably between 0.001 to 0.2 ppmw, more preferably 0.005 to 0.1 ppmw, and very preferably 0.01 to 0.08 ppmw.

A further aspect of the invention relates to the use of polycrystalline silicon for producing mono- or multicrystalline silicon.

The monocrystalline silicon preferably has a number of stacking defects of less than 300, preferably less than 200, more preferably less than 100, more particularly less than 10 per square centimeter.

The monocrystalline silicon preferably has a number of dislocation defects of less than 3, preferably less than 1, more preferably less than 0.3, more particularly less than 0.1, per meter of rod length.

The polysilicon of the invention is preferably used for producing monocrystals by the Czochralski or float zone process.

Monocrystalline silicon produced from polycrystalline silicon of the invention by means of crucible pulling (Czochralski (CZ) process) preferably has a dislocation-free length of the monocrystals of greater than 70%, preferably greater than 83%, more preferably greater than 87%, even more preferably greater than 90%, more particularly greater than 95%.

Further preferred is the use of the polysilicon of the invention for producing multicrystalline silicon by means of block casting or continuous casting processes, multicrystalline block solidification in a Bridgman furnace (Bridgman-Stockbarger method), vertical gradient freeze (VGF) process, ribbon growth process, edge-defined film-fed growth (EFB) process, and Direct Wafer™ process (from 1366technologies).

Multicrystalline silicon material produced from the polycrystalline silicon of the invention has an increased quality. The reason for the improved quality of material is not yet exactly understood in detail. It is known that when the solubility of nitrogen in the silicon is exceeded, $Si_3N_4$ deposits are formed. These deposits occur in the form of crystalline, acicular, and fibrous crystals. They may occur sporadically or in the form of clusters, often in conjunction with silicon carbide deposits. The crystalline deposits are formed, for example, on crucible walls during crucible pulling. It is thought that $Si_3N_4$ particles in the polysilicon function as seed particles in the melt in the crucible, and, in the course of the solidification to form the multicrystalline silicon block, are incorporated as $Si_3N_4$ particles into the multicrystal. $Si_3N_4$ is electrically nonconducting, but, along $Si_3N_4$ crystallites in the multicrystalline silicon, increased recombination activities are evident, which may adversely affect the lifetime of the charge carrier or give rise to short circuits. This leads to a lower quality on the part of the multicrystalline silicon material.

The plant 20 of FIG. 1 comprises three Siemens reactors 1 having in each case 56 carrier bodies, each indicated by a U-shaped carrier body 2 which is anchored in electrode mounts 19. At its reactor base 4, each reactor 1 possesses an offgas line 3 with which offgas is taken off from the reactor 1.

The reactors 1 are supplied via a gas line 17 with a TCS/DCS mixture. The TCS/DCS mixture is taken from a feedline 16.

Before entering the reactors 1, the TCS/DCS mixture is admixed via lines 18 and 13 with external hydrogen from a reservoir vessel 15 and/or with recycle gas, via the line 13, from the adsorber 9. The external hydrogen is hydrogen having a purity of 5.0.

The offgas taken off from the reactors 1 by the offgas line 3 is supplied to a heat exchanger 11. In the heat exchanger 11, which customarily comprises a plurality of condensation stages, it is separated into high-boiling constituents (e.g., hydrogen and impurities such as phosphanes, methane, nitrogen, and arsenic compounds) and low-boiling constituents (e.g., halosilanes). The high-boiling constituents of the offgas are supplied to a compressor 10 whose function is to raise the pressure level of the gaseous constituents to an extent which allows the hydrogen present to be resupplied later to the reactors 1. The high-boiling constituents (the hydrogen still with impurities) pass subsequently into an adsorber 9, whose function is to remove impurities such as phosphorus compounds (e.g., phosphanes), methane, hydrogen chloride and/or arsenic compounds. From the adsorber 9, the hydrogen recovered then passes back via the gas lines 13, as recycle gas, into the reactors 1.

The arrangement consisting of offgas line 3, heat exchanger 11, compressor 10, adsorber 9, and gas line 13 constitutes a recycle gas system, more particularly for the recovery of hydrogen.

The plant 20 further comprises a facility 7 for the processing of silane/halosilane. This facility 7 is supplied via a line 14 with the low-boiling constituents of the offgas. The function of the facility 7 is to separate the silane/halosilane mixtures recovered from the offgas by means of condensation stages. The silane/halosilane mixture leaving the facility 7 via a line 8 can either be returned as a gas and/or liquid to the reactors 1, or used for other processes.

From the offgas line 3, sampling lines 5 lead to a gas chromatograph 12. Furthermore, a further sampling line 6, which takes samples of the recycle gas downstream of the adsorber 9, leads to the gas chromatograph 12. The gas chromatograph 12 is used to determine the nitrogen content at various points in the recycle gas system.

Figure 2:
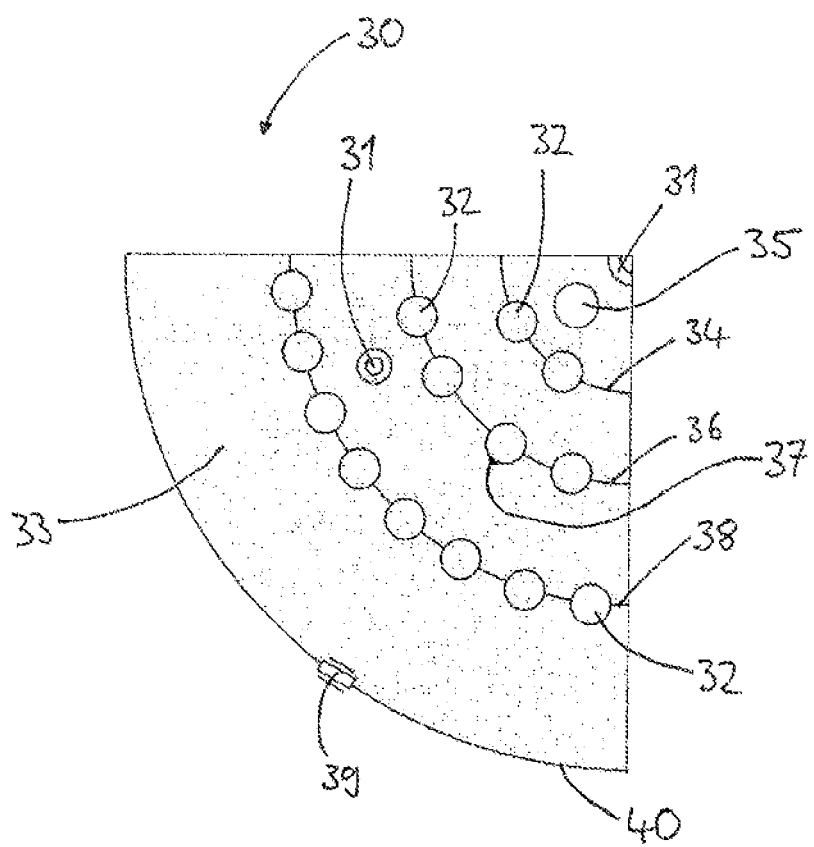
FIG. 2 shows a cross-sectional view of a Siemens reactor for implementing the process of the present invention

FIG. 2 shows a cross-sectional detail of a Siemens reactor 30 for implementing the process of the invention. Disposed in the interior of the reactor are silicon rods 32 in the form of three rod circles 34, 36, 38. The inner rod circle 34 has a total of eight, the middle rod circle 36 a total of 16, and the outer rod circle 38 a total of 32 silicon rods 32. The reaction gas is introduce through nozzles 31 in the baseplate 33 of the reactor 30. Offgas is taken off through an outlet 35 in the baseplate 33 of the reactor 30. The point 37 indicates a measuring area for determining the average rod temperature and/or the deposition temperature on one of the silicon rods 32. The measurement is made by means of a pyrometer or a thermal imaging camera (not shown) through a viewing window 39 in the reactor wall 40 on a silicon rod 32 measuring area that faces the reactor wall 40.

EXAMPLES

In accordance with table 1, various polysilicon rods (examples 1 to 13) were produced by the process of the invention with a recycle gas nitrogen content of less than 1000 ppmv (examples 1, 4-6, 8, 10 to 13). For purposes of comparison, furthermore, in a reactor of identical construction, polysilicon rods were produced where the recycle gas nitrogen content was at or above 1000 ppmv (examples 2, 3, 7, 9). The rods were comminuted and samples were analyzed for their $Si_3N_4$ content.

In the case of examples 1, 2, 7, and 9, the deposition temperature was below the deposition temperature critical for the formation of $Si_3N_4$ ($T_k$) of 1030° C. In the case of examples 3 to 6, 8, and 10 to 13, the deposition temperature was above $T_k$ (column 2, table 1).

The deposition temperature was determined by means of a pyrometer on a measuring area of 5 cm² as described under FIG. 2. At a reactor height of 4 m and a rod length of 3 m, the measurement height was about 1 m, starting from the end of the rod anchored in the electrode mount.

The hotspot temperature was initially at a rod end anchored in an electrode mount on the red circle 34 (cf. FIG. 2) in the direction of the reactor center. As the deposition time went on, it switched into a surface indentation of a rod in the rod circle 36 (cf. FIG. 2) at a height of approximately 2.2 m in the direction of the reactor center. In the further course of deposition, up to the end of deposition, the hotspot temperature was identified as being on the underside of the bridging arc of a rod on the rod circle 36 (cf. FIG. 2). These hotspot temperatures were measured via further viewing windows, using pyrometers or thermal imaging cameras.

All of the polysilicon rods were produced in a Siemens reactor as described in EP 2 077 252 A2.

The nitrogen content in the recycle gas (column 4, table 1) was determined in each case with a gas chromatograph (GC: Process GC: Siemens Maxum edition II; separating column: RTX-1 fused silica capillary, from Restek, column length: 60 m). Sampling took place via a sampling line on the offgas removal facility.

The silicon nitride ($Si_3N_4$) content in the polysilicon rods obtained was determined, after the rods had been comminuted, by means of SIMS (secondary ion mass spectrometry) and of a scanning electron microscope (SEM) with EDX analysis unit. For this purpose, a number of samples of each of the resulting silicon rods were analyzed at 200 locations, and the maximum values were ascertained (column 5, table 1). An $Si_3N_4$ content of 0% means that all 200 measurements were below the detection limit of 1 ppba. A content of 1% means that 2 out of 200 measurements were above this detection limit.

To test the quality of the polysilicon rods produced, in terms of the production of downstream products, monocrystals were additionally produced, using the Czochralski process.

The determination ox the dislocation (dislocation-free rod length; column 7, table 1) was observed optically during pulling to form the monocrystal, by a change in the pulling edge.

The dislocation-free rod length (pulling yield) is the percentage fraction of the overall rod length that is free from dislocation defects. The measurement of the overall rod length ignores the starting cone and final cone formed during the pulling process. The relevant rod length is therefore only the cylindrical rod length.

TABLE 1

| Si rods/ example | Deposition temperature [° C.] | Hotspot temperature [° C.] | $N_2$ in the recycle gas [ppmv] | $Si_3N_4$ [%] | Stacking defects per cm² | Dislocation-free length of the monocrystals [%] |
|---|---|---|---|---|---|---|
| 1 | 1030 ($T_k$ − 0) | 1079 | 87 | 0 | 1 | 90% |
| 2 | 1030 ($T_k$ − 0) | 1079 | 6400 | 0 | 3000 | 87% |
| 3 | 1068 ($T_k$ + 38) | 1133 | 1000 | 1.5 | 120 | 55% |
| 4 | 1068 ($T_k$ + 38) | 1134 | 650 | 1 | 115 | 71% |
| 5 | 1070 ($T_k$ + 40) | 1136 | 0.4 | 0 | 1 | 89% |
| 6 | 1080 ($T_k$ + 50) | 1150 | 550 | 0.5 | 116 | 80% |
| 7 | 1000 ($T_k$ − 30) | 1040 | 1000 | 0 | 100 | 87% |
| 8 | 1068 ($T_k$ + 38) | 1133 | 94 | 0 | 20 | 90% |
| 9 | 1030 ($T_k$ − 0) | 1079 | 1000 | 0 | 105 | 86% |
| 10 | 1068 ($T_k$ + 38) | 1132 | 450 | 0.5 | 99 | 82% |
| 11 | 1080 ($T_k$ + 50) | 1150 | 0.4 | 0 | 0 | 89% |
| 12 | 1150 (Tk + 120) | 1290 | 0.4 | 0 | 0 | 87% |
| 13 | 1200 (Tk + 170) | 1375 | 0.4 | 0 | 0 | 85% |

The number of stacking defects (column 6, table 1) in the monocrystals obtained was determined by a count under an optical microscope (test method ASTM F416). For the stacking error counts, test disks of the silicon rods were oxidized. The oxide layer was subsequently etched away and the defects were visualized by a structural etch. The defect count was conducted under an optical microscope with the aid of image recognition software.

The parameters used in the production of the monocrystals were identical for all of the polysilicon rods as starting material.

In the case of examples 1, 2, and 9, for which deposition took place at $T_k$ (1030° C.), it can be stated that no $Si_3N_4$ was detectable, irrespective of the nitrogen content of the recycle gas. For a $T_k$ undershoot by 30° C. and a nitrogen content of 1000 ppmv (example 7), as well, it was not possible to detect any $Si_3N_4$. It is noted, however, that an increased nitrogen content of the recycle gas as in example 2, of 6400 ppmv, leads to a large number of stacking defects (3000). Because the hotspot temperature in the case of examples 1, 2, 7, and 9 was always below the $Si_3N_4$ formation temperature, no $Si_3N_4$ was detected. In example 2, the high number of stacking defects is attributable in all probability to the high $N_2$ content of the recycle gas and the inert incorporation of the latter into the resulting polysilicon.

From examples 3, 4, 8, and 10 it is clear what effect the recycle gas $N_2$ content has on the $Si_3N_4$ content. The rods in examples 3, 4, 8, and 10 were all produced at a deposition temperature of 38° C. above $T_k$, in other words at 1068° C. An $N_2$ content of 1000 ppmv (example 3) resulted in an $Si_3N_4$ content of 1.5%. When these $Si_3N_4$-containing silicon rods are used for producing silicon monocrystals, only 55% of the overall rod length is dislocation-free. A reduction in the recycle gas nitrogen content by more than half, to 450 ppmv, as in example 10, reduces the $Si_3N_4$ content of the rods obtained to 0.5% and leads to monocrystalline silicon as a downstream product with an 82% dislocation-free length. In the case of the rods produced in example 8 with a nitrogen content of only 94 ppmv, no $Si_3N_4$ was detectable. Accordingly, monocrystalline silicon with a 90% dislocation-free rod length was obtainable, despite the fact that the hotspot temperature was well above the $Si_3N_4$ formation temperature. An increase in the deposition temperature from 1030° C. to 1068° C. or even 1080° C. (example 11) causes a twofold exponential rise in the deposition rate and therefore significantly increases the profitability of the process.

In examples 5, 6, and 11, silicon rods were produced at a deposition temperature above $T_k$. The rods of example 5 ($T_k+38°$ C.) were produced at a recycle gas $N_2$ content of only 0.4 ppmv, and no $Si_3N_4$ was detectable. In the downstream product, a dislocation-free length of 89% was achievable. The rods of example 6 were produced at a deposition temperature of 1080° C. with an content of 550 ppmv. This $N_2$ content, in combination with the high deposition temperature, led to an $Si_3N_4$ content of 0.5%. In the downstream product, accordingly, it was possible to obtain a dislocation-free length of 80%. The rods in example 11 were likewise produced at 1080° C. However, the content of the recycle gas was only 0.4 ppmv. Similarly to the situation in example 5, it was no longer possible to detect $Si_3N_4$, and the dislocation-free length of the downstream product was 89%.

The rods in examples 12 and 13 were deposited at deposition temperatures well above $T_k$ ($T_k+120°$ C. and $T_k+170°$ C.). The $N_2$ content of the recycle gas was likewise only 0.4 ppmv. As in example 11, it was impossible to detect either $Si_3N_4$ or stacking defects. In spite of the high hotspot temperatures of 1290° C. and 1375° C., respectively, the low $N_2$ content of the recycle gas prevented the formation of $Si_3N_4$.

In view of the exponential relationship existing between the deposition temperature and the deposition rate, rate increases of up to a factor of 2-3 are possible and hence significantly lower not only the production costs but also the specific capital costs.

The invention claimed is:

1. A process for producing a polycrystalline silicon, comprising:
   introducing a reaction gas comprising a hydrogen, and a silane and/or one or more halosilanes, into a reactor comprising a reaction chamber containing at least one heated carrier body on which an elemental silicon is deposited by pyrolysis at a deposition temperature of between 1030° C. and 1300° C. to form the polycrystalline silicon, wherein nitrogen is present in the reaction chamber;
   continuously removing an offgas from the reactor;
   separating hydrogen from the offgas in a recycle gas system to produce a recovered hydrogen;
   supplying the recovered hydrogen to the reactor as a recycle gas, from the recycle gas system, and
   measuring a nitrogen content of the recycle gas by a measuring facility comprising a gas chromatograph,
   wherein the nitrogen content of the recycle gas is less than 1000 ppmv,
   wherein when the nitrogen content of the recycle gas exceeds a set limit of nitrogen content between 0.01 ppmv and 1000 ppmv, interrupting the supply of the recycle gas to the reactor and allowing the process to proceed with a supply of external hydrogen, or discontinuing the supply of the reaction gas while holding the at least one heated carrier body at a temperature above 900° C. while the recycle gas system is completely decoupled from the reaction chamber until the nitrogen content of the recycle gas falls below the set limit of nitrogen content.

2. The process of claim 1, wherein the nitrogen content of the recycle gas is less than 100 ppmv.

3. The process of claim 1, wherein the nitrogen content of the recycle gas is less than 10 ppmv.

4. The process of claim 1, wherein the nitrogen content of the recycle gas is less than 0.5 ppmv.

5. The process of claim 1, wherein the elemental silicon is deposited at the deposition temperature of between 1032° C. and 1250° C.

6. The process of claim 1, wherein the elemental silicon is deposited at the deposition temperature of between 1040° C. and 1200° C.

7. The process of claim 1, wherein the elemental silicon is deposited at the deposition temperature of between 1060° C. and 1150° C.

8. The process of claim 1, wherein the one or more halosilanes comprises a chlorosilane.

9. The process of claim 1, wherein the one or more halosilanes comprises trichlorosilane or a mixture of trichlorosilane and dichlorosilane.

10. The process of claim 1, wherein prior to the start of the process, a pressure of the reaction chamber is increased by supplying hydrogen followed by a pressure decrease, where a maximum pressure during the pressure increase is in a range between 3.1 and 15.0 bar, and a minimum pressure during the pressure decrease is in a range between 1.1 and 3 bar.

11. The process of claim 1, wherein prior to the start of the process, a pressure of the reaction chamber is increased by supplying hydrogen followed by a pressure decrease, where a maximum pressure during the pressure increase is in a range between 6.0 and 8.0 bar, and a minimum pressure during the pressure decrease is at about 1.4 bar.

12. The process of claim 10, wherein the pressure increase and the pressure decrease each last between 1 and 60 min.

13. The process of claim 10, wherein the pressure increase takes place with a hydrogen volume flow rate per unit reactor volume $V_R$ of between 5 and 400 $m^3/hV_R$.

14. The process of claim 10, wherein the pressure increase takes place with a hydrogen volume flow rate per unit reactor volume $V_R$ of between 8 and 200 $m^3/hV_R$.

15. The process of claim 10, wherein the pressure increase takes place with a hydrogen volume flow rate per unit reactor volume $V_R$ of between 10 and 100 $m^3/hV_R$.

16. The process of claim 10, wherein the pressure increase takes place with a hydrogen volume flow rate per unit reactor volume $V_R$ of 20 $m^3/hV_R$.

* * * * *